Feb. 24, 1942.  F. M. REID  2,274,503
BRAKE DRUM
Filed Feb. 3, 1941  2 Sheets-Sheet 1
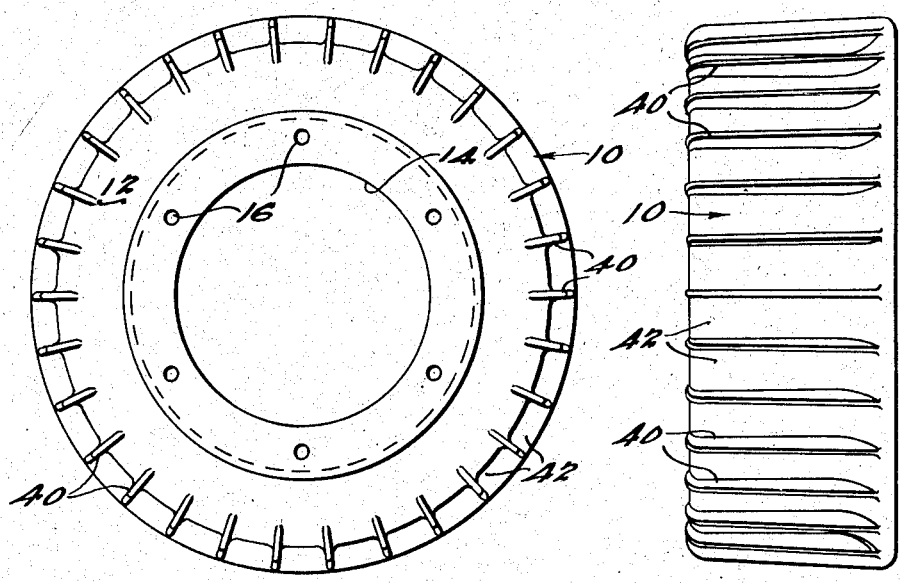
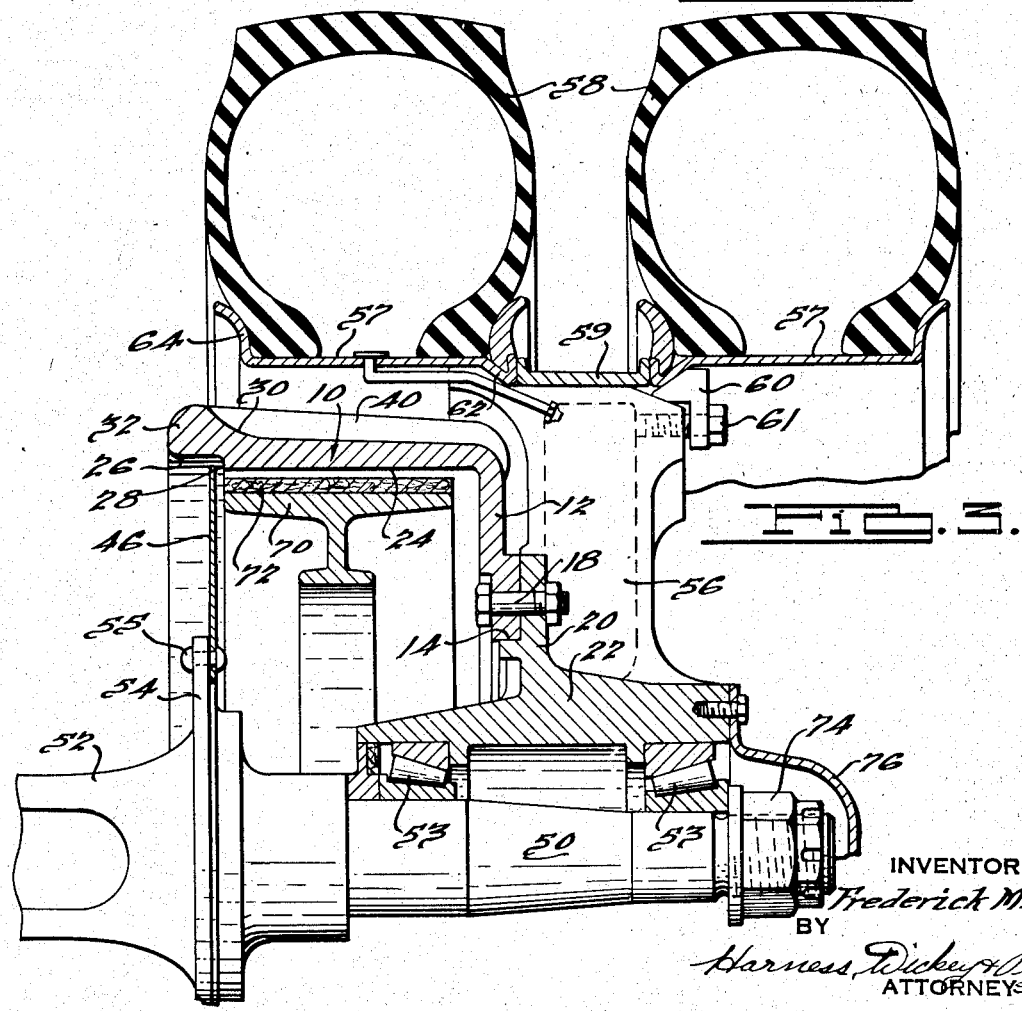
INVENTOR
Frederick M. Reid
BY
Harness, Dickey & Pierce
ATTORNEYS

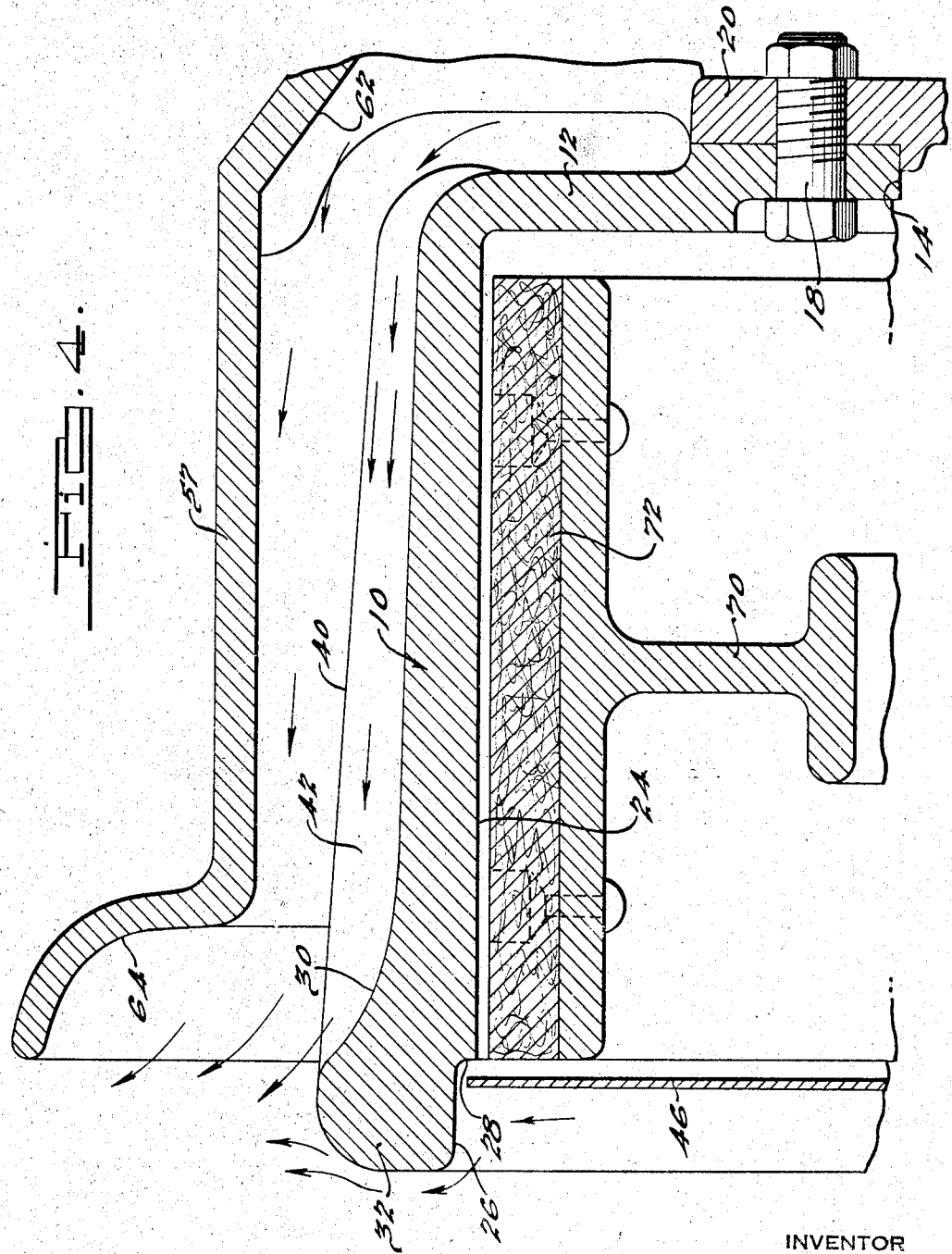

Patented Feb. 24, 1942

2,274,503

UNITED STATES PATENT OFFICE 2,274,503

BRAKE DRUM

Frederick M. Reid, Detroit, Mich., assignor to Fruehauf Trailer Company, Detroit, Mich., a corporation of Michigan Application February 3, 1941, Serial No. 377,178

1 Claim. (Cl. 188—218)

This invention relates to brake drums generally and in a more limited sense to brake drums for motor vehicles and the combination of such drums with the wheels of motor vehicles, the principal object being the provision of a brake drum construction that is simple in construction, economical to manufacture and which will run at a much lower temperature than conventional brake drums under the same conditions in service.

Objects of the invention include the provision of a brake drum structure so constructed and arranged as to dissipate heat therefrom in an improved and highly efficient manner; the provision of a brake drum so constructed and arranged that in rotating it causes air to flow over the same in a predetermined and controlled manner to efficiently dissipate the heat and may be absorbed thereby during a braking operation; the provision of a brake drum so constructed and arranged as to cause air to flow from the closed end thereof over the outer surface thereof towards the open end thereof by reason of its rotation in air; the provision of a brake drum provided with means on its periphery to enhance the flow of air thereover during rotation thereof as well as to render the structure more rigid; the provision of a brake drum so constructed and arranged as to substantially prevent heat checks in the braking surface thereof from progressing out through the open edge of the drum; the provision of a brake drum so constructed and arranged as to foster the transmission of heat therein towards the open edge of the drum and provided with means for enhancing the dissipation of heat from the open edge of the drum; and the provision of a brake drum so constructed and formed on its outer surface as to cause it to act upon the surrounding air during rotation and cause such air to flow in an efficient manner in an axial direction thereover towards the open end of the drum whereby to enhance the dissipation of heat from the drum.

Other objects of the invention include the provision of a brake drum and wheel rim assembly so constructed and arranged as to provide an approximately annular passage increasing in diameter from one end of the drum towards the opposite end thereof whereby during rotation the air entrapped between the brake drum and the rim is subjected to centrifugal force tending to cause the air to flow axially of the brake drum thereby to effect a flow of air over the surface of the brake drum to facilitate the dissipation of heat therefrom; and the provision of a brake drum and wheel rim assembly so constructed and arranged as to form between them centrifugal pumping means acting on the surrounding air to effect a continuous and improved flow of air axially over the brake drum and wheel rim during rotation thereof.

The above being among the objects of the present invention the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is an elevational view of my improved brake drum looking axially towards the closed end thereof;

Fig. 2 is a side elevational view of the brake drum shown in Fig. 1;

Fig. 3 is a fragmentary, sectional view taken axially through a wheel and brake drum assembly incorporating my improved brake drum structure; and, Fig. 4 is an enlarged, fragmentary, sectional view taken in the same plane as Fig. 3 but illustrating the construction of the brake drum and its relation with respect to the cooperating wheel rim in greater detail.

It is well known in the art that the operating temperature of brake drums in motor vehicles and the like has an important bearing on the efficiency and particularly the life of the brakes of the vehicle. This is particularly true in connection with commercial vehicles and particularly the heavier types of trucks and trailers. Severe application of brakes in such vehicles often raises the temperature of the brake drum to such an extent as to foster inefficient operation and early destruction of the brake lining, and at the same time such heat is transmitted in conventional constructions to the wheel rims and tires in some cases to such an extent as to foster early destruction of the tires themselves. In fact the problem of dissipating heat from brake drums, particularly in commercial type vehicles, has been so serious for a number of years that large sums of money have been expended in attempting to develop designs to overcome this problem. Many different designs have been proposed with varying results but as far as I am aware no design prior to the present invention has been proposed that is considered sufficiently economical for commercial use and yet attains the desired degree of cooling. As a result the bulk of the commercial types of brake drums today comprise either a plain surfaced brake drum or one that is circumferentially ribbed. Tests indicate that as far as heat dissipation is concerned no particular advantage is gained in employing either one or the other of these conventional types and the temperatures of the drums during ordinary or usual severe type of brake application is found to raise the temperature of such drums usually to the neighborhood of 350° to 400° F.

A brake drum constructed in accordance with the present invention will cost substantially no more to produce than the conventional plain or circumferentially ribbed types and in any event no more than the latter type. At the same time because of its design the dissipation of heat therefrom is so accelerated as compared to the conventional types of drum that tests indicate that it will operate at temperatures of 150° F. to 250° F. less than conventional types of drums of the same size and under the identical conditions of operation.

Referring now to the accompanying drawings it will be noted that the brake drum constituting the part of the present invention comprises an approximately cylindrical rim portion indicated generally at 10 having integrally secured to one end thereof a radially inwardly extending web 12. The structure is, of course, preferably formed of cast metal and this form is shown in the drawings. As indicated in Figs. 1, 3 and 4 the web 12 is centrally provided with a circular opening 14 and the web 12 around the margins of the opening is provided with a plurality of openings 16 therethrough arranged in equally angularly spaced relation about the axis of the drum for the purpose of receiving bolts 18 employed in clamping the brake drum to the flange 20 of a wheel hub such as 22.

As best brought out in Fig. 4 the inner surface of the rim 10 is formed to provide a cylindrical braking surface 24 which extends from a point adjacent the web 12 to a point adjacent but spaced a material distance from the open end of the drum, the internal diameter of the drum being increased outwardly beyond the braking surface 24 towards the open end of the drum as indicated at 26 thereby forming a shoulder 28 between the braking surface 24 and the portion 26, this last feature being desirable but not essential in the broader aspects of the present invention.

The main body portion of the rim 10 is of minimum thickness adjacent the web 12 and increases in thickness towards the open end of the drum as best brought out in Fig. 4. As also best brought out in Fig. 4 it will be noted that in the particular drum shown by way of illustration the thickness of the main body portion of the rim 10 preferably increases gradually from a point adjacent the web 12 to a point axially inwardly spaced from the open end of the drum and then increases at a more rapid rate to form an outwardly curved surface 30 which preferably merges in a smooth curve into the outer free edge or lip 32 of the drum which is more or less bulbous in character. The radius of curvature of the surface 30 is materially in excess of the thickness of the drum at the area in which it is located. It will thus be appreciated that in the specific embodiment of the brake drum shown by way of illustrating the present invention the major portion of the outer surface of the main body portion of the rim 10 is of frusto-conical nature merging at its larger end into the axially and radially outwardly curved surface 30 which in turn merges into the bulbous rim portion 32. The axial taper of the main body portion of the drum is greater, that is more abrupt, than would ordinarily be employed for the purpose of providing a desired degree of draft for moulding purposes, the efficiency of the structure becoming greater with increasing taper from the standpoint of the present invention as will be appreciated from the explanation hereinafter set out.

The main body portion of the rim 10 is thus so shaped that when rotating, the air clinging to its outer surface will be subjected to centrifugal force which will tend to draw such air axially along the outer surface of the brake drum towards the outer end thereof, and the effect of the centrifugal force will be increased as it approaches the open end of the drum not only because of the increased diameter of the surface but because of the accelerated effect that will be imparted thereto by the curved portion 30 adjacent the open end of the drum.

In order to increase the flow of air over the outer surface of the brake drum, as above described, as well as to impart additional strength thereto it is preferable to provide ribs on the exterior surface of the rim portion 10, and while in the broader aspects of the invention these ribs may be disposed at an angle to a plane passing through the axis of the drum in order to increase the fan-like effect thereof on the surrounding air to a greater or lesser extent, I prefer, in order to eliminate rights and lefts in production and to simplify the foundry practice in the casting of the same, to arrange these ribs substantially in planes passing through the axis of the drum. Such ribs are indicated at 40 and it will be noted that they are preferably equally angularly spaced around the circumference of the drum. Preferably these ribs begin at the junction of the web 12 with the main body portion 10 of the rim at which point they are preferably of a material height as indicated, and extend with their outer surface in an approximately straight line merging at its outer end in a more or less tangential manner into the circumferentially outer surface of the bulbous lip 32. It will be appreciated that the number of ribs 40 employed may be varied within greater or lesser limits but, as a matter of illustration, I have found that thirty of such ribs on a brake drum having a braking surface 24 of sixteen inches in diameter is satisfactory. These ribs 40 are preferably smooth and are well filleted at their area of junction with the main body portion of the rim 10 so as to form a more or less rounded bottom channel 42 between each adjacent pair devoid of any sharp breaks or shoulders.

The ribs 40 obviously reinforce the rim portion 10 of the brake drum against distortion but additionally serve to force a larger body of air to rotate around with the drum during rotation thereof and thereby to subject a larger body of air to the effects of centrifugal force tending to cause it to flow axially of the drum towards the open end thereof serving a purpose in this respect similar to the blades of a centrifugal fan and accentuating the axial flow of air over the drum. Additionally, the ribs 40 serve to increase the effective surface of the drum which comes in contact with the air thus flowing over it and thereby aid in increasing the rapidity with which the heat built up in the drum because of a braking operation is transferred to the surrounding air. It will, of course, be appreciated that it is important not to provide any obstruction in the channels 42 thus formed on the exterior surface of the drum between adjacent ribs 40 as any such obstructions would serve to impede the desired flow of air through the channels 42 and thus reduce the efficiency of the drum from a heat dissipating standpoint.

Because of the increase in thickness of the rim of the drum towards the open end thereof and because of the flow of air over the exterior surface thereof towards the open end of the drum this drum construction has a tendency to draw the heat set up therein during a braking operation towards the open end of the drum and the thick bulbous sectioned lip 32 is provided at the end of the drum to aid in drawing the heat thereto and to dissipate heat therefrom. The usual brake cover plate 46 which is conventionally provided at the open end of the brake drum is in this case preferably arranged in relatively close relationship with respect to the shoulder 28, under which circumstances it will be appreciated that the major portion of the bulbous lip 32 is surrounded by open air constantly flowing over it during operation which facilitates the dissipation of heat from the bulbous lip 32 to the surrounding air.

The formation of the shoulder 28 and surface 26 radially outwardly offset from the braking surface 24 at the open end of the drum is important for the following reasons and constitutes a more limited phase of the present invention. Braking surfaces, such as the braking surface 24 in the particular drum construction shown, are subject to the development of heat checks or cracks during continued operation. In conventional types of brake drum constructions where the braking surface extends without interruption completely to the open edge of the drum, these heat checks gradually extend to the open edge of the drum and there often develop into major cracks in the drum structure which foster early destruction of the drum. By the provision of the shoulder 28 such heat checks are definitely limited from extending beyond the shoulder 28 and thus failure of the brake drum of the present invention because of heat checks extending through the free edge thereof is definitely eliminated.

In accordance with a further phase of the present invention, the above described brake drum may be so positioned and arranged with respect to a surrounding wheel rim as to increase the above described cooling effect on the drum. This additional effect may be explained by further reference to Figs. 3 and 4. As indicated in these figures it will be noted that the hub 22 is rotatably positioned upon the spindle 50 of an axle 52 by means of anti-friction bearings 53. The axle 52 is provided with a flange 54 to which the cover plate 46 may be secured as by means of rivets 55. The hub 22 constitutes the hub of a wheel having a plurality of individual spokes 56 the outer ends of which are suitably and conventionally formed to receive a pair of rims 57 each of which carries a corresponding pneumatic tire 58. The rims 57 are spaced from one another at the outer ends of the spokes 56 by means of a spacer ring 59 and both rims 57 are simultaneously secured in place to the wheel by means of a plurality of clamping members 60 and cooperating bolts 61.

The inner rim 57 is positioned in substantial radial alignment with the brake drum of the present invention and preferably with the axially outwardly and radially inwardly tapered portion 62 thereof partially to the right, as viewed in Figs. 3 and 4, of the closed end of the drum as indicated. The relationship of the width of the rims 57 with respect to the axial length of the brake drum is preferably such that the conventionally curved flange 64 at the inner edge of the inner rim 57 lies in substantial radial alignment with the curved portion 30 of the rim 10 of the brake drum.

From the above it will be appreciated particularly by reference to Fig. 4, that the rim portion 10 of the brake drum and the cooperating surrounding rim 57 thus cooperates with one another to form a more or less annular air passageway between them that is of a minimum diameter adjacent the closed end of the brake drum and a maximum diameter adjacent the open end of the brake drum, these two members thus combining to form a closed annular chamber of greater diameter at one end than at the opposite end and shaped somewhat to obtain a more or less Venturi-like action, whereby upon rotation air entrapped between them is acted upon centrifugally to cause it to flow axially of both the brake drum and the wheel rim with great efficiency and in relatively great volume. Thus this flow of air serves to absorb heat from both the brake drum and the wheel rim and aids in increasing the life of both therefor.

For the purpose of identification it may be mentioned that in Figs. 3 and 4 the brake drum is indicated as being interiorly provided with a brake shoe 70 peripherally provided with the usual friction lining 72 for engagement with the braking surface 24, that the wheel hub 22 is secured against axial movement on the spindle 50 by means of a nut 74 cooperating with the inner race of the outer anti-friction bearing 53 and that the open end of the hub 22 is closed by a conventional hub cap 76.

Having thus described my invention, what I claim by Letters Patent is:

A brake drum comprising a generally circular rim portion and a radially inwardly directed web portion fixed to one end thereof, a cylindrical braking surface on the inner face of said rim portion, the outer surface of said rim portion being frusto-conical over a portion of its length with the smaller end thereof adjacent said web and merging at its axially outer end into a gradually radially outwardly curving surface, the open end of said rim portion being formed to provide a relatively thick bulbous lip mainly disposed axially outwardly of said braking surface and merging into said outwardly curved surface in a substantially smooth curve, the radially inner surface of said lip being radially outwardly offset from said braking surface and ribs formed integrally with and projecting outwardly from said main body portion forming between adjacent pairs thereof substantially unobstructed channels extending from substantially one end of said rim to the other end thereof.

FREDERICK M. REID.